United States Patent
Stamenov et al.

(10) Patent No.: US 12,468,146 B2
(45) Date of Patent: Nov. 11, 2025

(54) ELECTRONIC DEVICE WITH A TUNABLE LENS

(71) Applicant: Apple Inc., Cupertino, CA (US)

(72) Inventors: Igor Stamenov, Manteca, CA (US); Richard J. Topliss, Cambridge (GB); Ran He, San Jose, CA (US); Peng Lv, San Jose, CA (US); Yuan Li, Campbell, CA (US); James E. Pedder, Oxfordshire (GB); Thomas M. Gregory, Cambridgeshire (GB)

( * ) Notice: Subject to any disclaimer, the term of this patent is extended or adjusted under 35 U.S.C. 154(b) by 349 days.

(21) Appl. No.: 18/155,372

(22) Filed: Jan. 17, 2023

(65) Prior Publication Data

US 2023/0324676 A1  Oct. 12, 2023

Related U.S. Application Data

(63) Continuation of application No. PCT/US2021/042929, filed on Jul. 23, 2021.

(60) Provisional application No. 63/056,316, filed on Jul. 24, 2020.

(51) Int. Cl.
*G02B 26/08* (2006.01)
*G02B 27/01* (2006.01)

(52) U.S. Cl.
CPC ..... *G02B 26/0875* (2013.01); *G02B 27/0176* (2013.01); *G02B 2027/0154* (2013.01)

(58) Field of Classification Search
CPC ............ G02B 26/0875; G02B 27/0176; G02B 2027/0154; G02B 2027/0181; G02B 2027/0185; G02B 3/14; G02B 27/0172
See application file for complete search history.

(56) References Cited

U.S. PATENT DOCUMENTS

| | | |
|---|---|---|
| 8,755,124 B2 | 6/2014 | Aschwanden et al. |
| 2010/0182703 A1 | 7/2010 | Bolis |
| 2011/0032624 A1 | 2/2011 | Bolis et al. |
| 2014/0285911 A1 | 9/2014 | Aschwanden et al. |
| 2015/0309334 A1 | 10/2015 | Stevens et al. |

(Continued)

FOREIGN PATENT DOCUMENTS

| | | |
|---|---|---|
| EP | 2869097 A1 | 5/2015 |
| WO | 2019186132 A2 | 10/2019 |
| WO | 2019186183 A1 | 10/2019 |

*Primary Examiner* — Matthew Mikels
(74) *Attorney, Agent, or Firm* — Treyz Law Group, P.C.; Joseph F. Guihan; Jinie M. Guihan

(57) ABSTRACT

A lens module may include a transparent lens element, a lens shaping structure that is coupled to the transparent lens element, and a plurality of actuators that are configured to adjust a position of the lens shaping structure to adjust the transparent lens element. The lens shaping structure may include a plurality of extensions that are each coupled to a respective actuator. To ensure the lens shaping structure has desired curvature between the extensions, the lens shaping structure may have a portion in one or more segments between adjacent extensions that has a property with a different magnitude than an additional portion of the lens shaping structure. The portion between the adjacent extensions may have an increased or decreased rigidity relative to the additional portions. The portion between the adjacent extensions may have a different width, thickness, or Young's modulus compared to the additional portions.

24 Claims, 10 Drawing Sheets

(56) References Cited

U.S. PATENT DOCUMENTS

| | | |
|---|---|---|
| 2015/0378067 A1 | 12/2015 | Stevens et al. |
| 2016/0124220 A1 | 5/2016 | Bueeler et al. |
| 2019/0104239 A1 | 4/2019 | Aschwanden |
| 2020/0089024 A1 | 3/2020 | Stevens et al. |
| 2020/0096770 A1* | 3/2020 | Pedder ............... G02B 27/0172 |

* cited by examiner

ELECTRONIC DEVICE WITH A TUNABLE LENS

This application is a continuation of international patent application No. PCT/US2021/042929, filed Jul. 23, 2021, which claims priority to U.S. provisional patent application No. 63/056,316, filed Jul. 24, 2020, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A head-mounted device may have a display that displays content for a user. Head-mounted support structures in the device support the display on the head of the user.

A lens module in the head-mounted device may include a transparent lens element, a lens shaping structure that is coupled to the transparent lens element, and a plurality of actuators that are configured to adjust a position of the lens shaping structure to adjust the transparent lens element. The lens module may also include an additional transparent lens element and a fluid-filled chamber between the two transparent lens elements.

The lens shaping structure may include a plurality of extensions that are each coupled to a respective actuator. To ensure the lens shaping structure has desired curvature between the extensions, the lens shaping structure may have a portion in one or more segments between adjacent extensions that has a property with a different magnitude than an additional portion of the lens shaping structure. The portion between the adjacent extensions may have an increased or decreased rigidity relative to the additional portions of the lens shaping structure.

The portion between the adjacent extensions of the lens shaping structure may have a different width, thickness, or Young's modulus compared to additional portions of the lens shaping structure. The portion between the adjacent extensions of the lens shaping structure may have a bend. The portion between the adjacent extensions of the lens shaping structure may have a plurality of protrusions or a plurality of recesses. Different segments of the lens shaping structure may have different modified portions (or no modified portion).

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

The lens modules in the head-mounted device may include lenses that are adjustable. For example, fluid-filled adjustable lenses may be used to adjust the display content for specific viewers.

Figure 1:
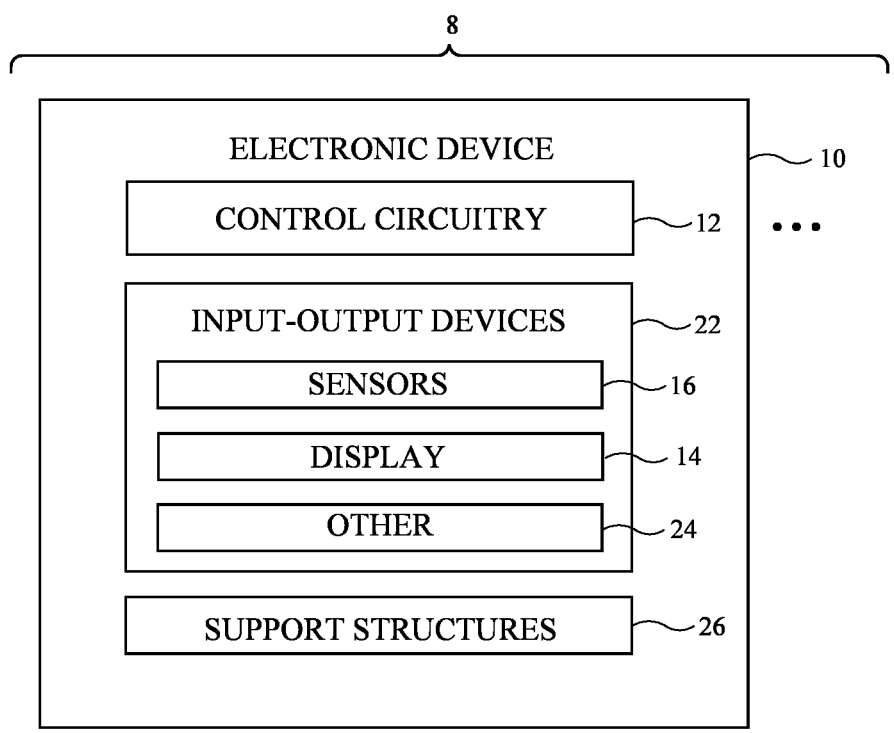
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
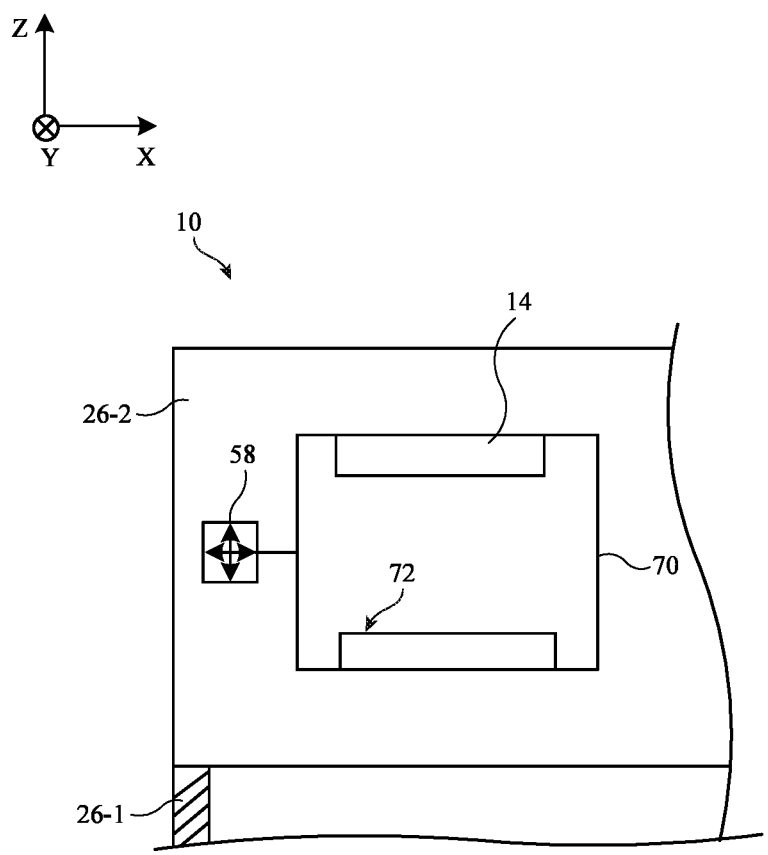
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face.

Display 14 may include left and right display panels (e.g., left and right pixel arrays, sometimes referred to as left and right displays or left and right display portions) that are mounted respectively in left and right display modules 70 corresponding respectively to a user's left eye and right eye. A display module corresponding the user's left eye is shown in FIG. 2.

Each display module 70 includes a display portion 14 and a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes.

In some cases, the distance between lens module 72 and display 14 is variable. For example, the distance between the lens module and the display any be adjusted to account for the eyesight of a particular user. In another example, the lens module may include an adjustable lens element. The curvature of the adjustable lens element may be adjusted in real time to compensate for a user's eyesight, as one example.

Figure 3:
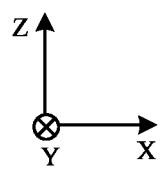
FIGS. 3 and 4 are cross-sectional side views of an illustrative lens module including actuators and a lens shaping element in accordance with an embodiment.
Figure 3:
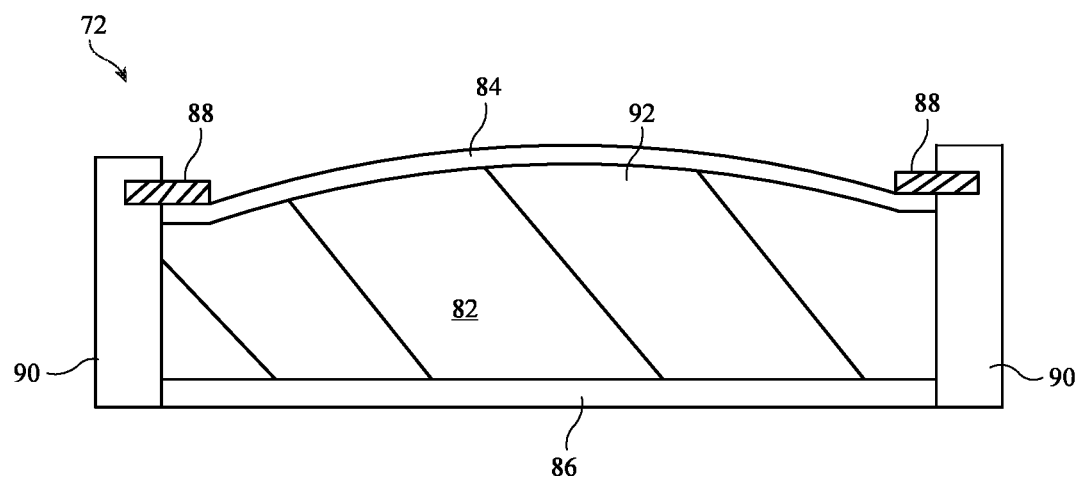

In some cases, an adjustable lens module may include a fluid-filled chamber. FIG. 3 is a cross-sectional side view of an adjustable lens module 72 with a fluid-filled chamber. As shown, fluid-filled chamber 82 (sometimes referred to as chamber 82 or fluid chamber 82) that includes fluid 92 is interposed between lens elements 84 and 86.

Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may be circular, may be elliptical, or may have any another desired shape.

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically or cylindrically concave), or convex (e.g., spherically or cylindrically convex). Rigid lens elements may be formed from a material having a Young's modulus that is greater than 25 GPa, greater than 30 GPa, greater than 40 GPa, greater than 50 GPa, etc.

Figure 4:
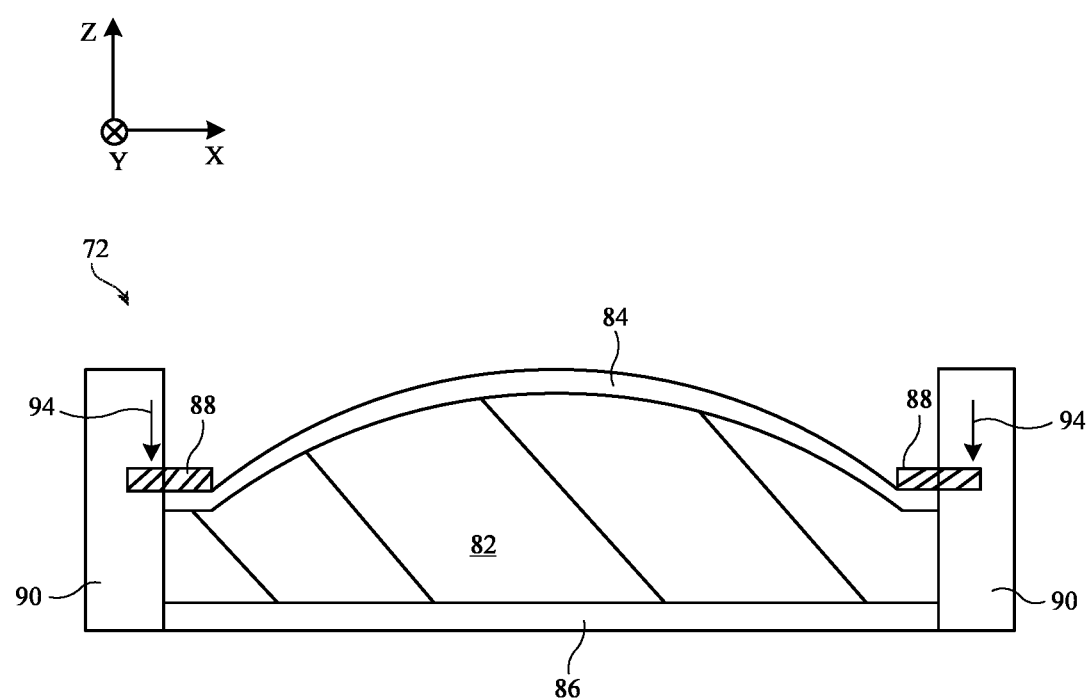

In addition to lens elements 84 and 86 and fluid-filled chamber 82, lens module 72 also includes a lens shaping element 88. Lens shaping element 88 may be coupled to one or more actuators 90 (e.g., positioned around the circumference of the lens module). The lens shaping element 88 may also be coupled to lens element 84. Actuators 90 may be moved to position lens shaping element 88 (sometimes referred to as lens shaper 88, deformable lens shaper 88, lens shaping structure 88, lens shaping member 88, annular member 88, ring-shaped structure 88, etc.). The lens shaping element 88 in turn manipulates the positioning/shape of lens element 84. In this way, the curvature of the lens element 84 (and accordingly, the lens power of lens module 72) may be adjusted. An example of actuators 90 and lens shaper 88 being used to change the curvature of lens element 84 is shown in FIG. 4. As shown, lens shaper 88 is moved in direction 94 by actuators 90. This results in lens element 84 having more curvature in FIG. 4 than in FIG. 3.

Figure 5:
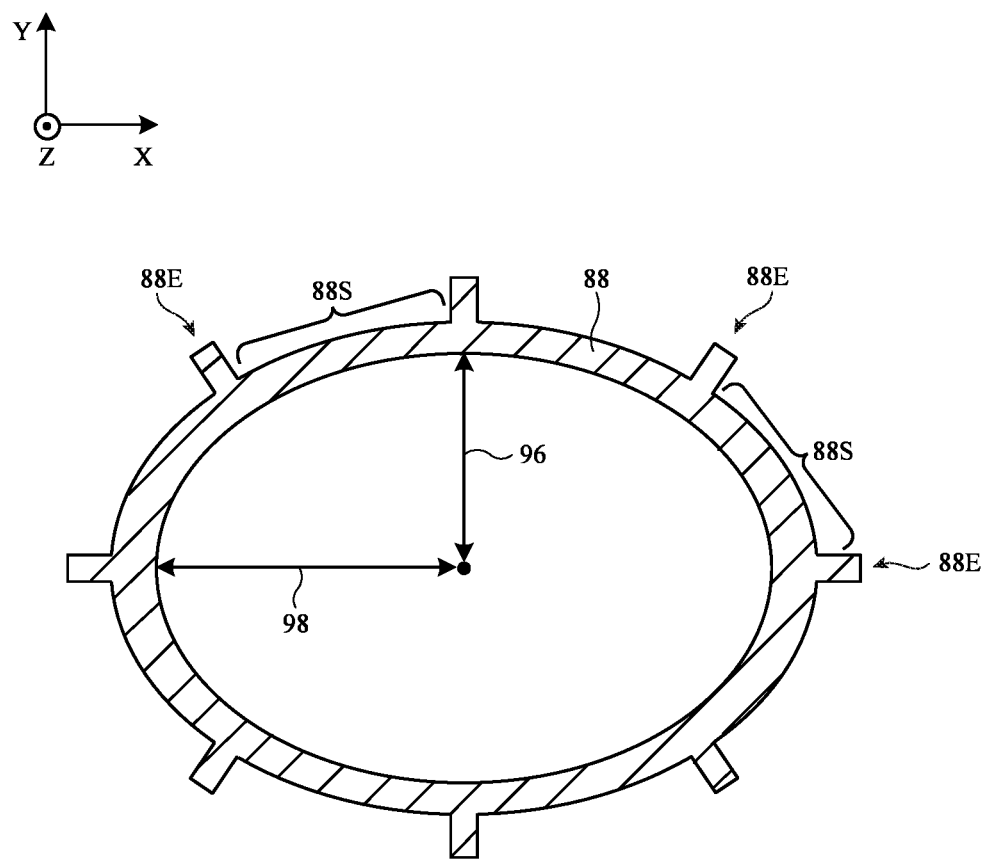
FIG. 5 is a top view of an illustrative lens shaping element that includes extensions for coupling to respective actuators in accordance with an embodiment.

FIG. 5 is a top view of an illustrative lens shaping element 88. As shown, lens shaping element 88 may have an annular or ring shape with the lens shaping element surrounding a central opening. The lens shaping element may have any desired shape. For example, the lens shaping element may be circular, elliptical, or have an irregular shape. In the example of FIG. 5, the lens shaping element has an irregular shape (e.g., a non-uniform radius around the ring shape). For example, a first distance 96 (e.g., a minimum distance) from the center of the central opening to the edge of the lens shaping element may be smaller than a second distance 98 (e.g., a maximum distance) from the center of the central opening to the edge of the lens shaping element. Distance 96 and 98 may be less than 100 millimeters, less than 60 millimeters, less than 40 millimeters, less than 30 millimeters, greater than 10 millimeters, greater than 20 millimeters, between 10 and 50 millimeters, etc.

Figure 6:
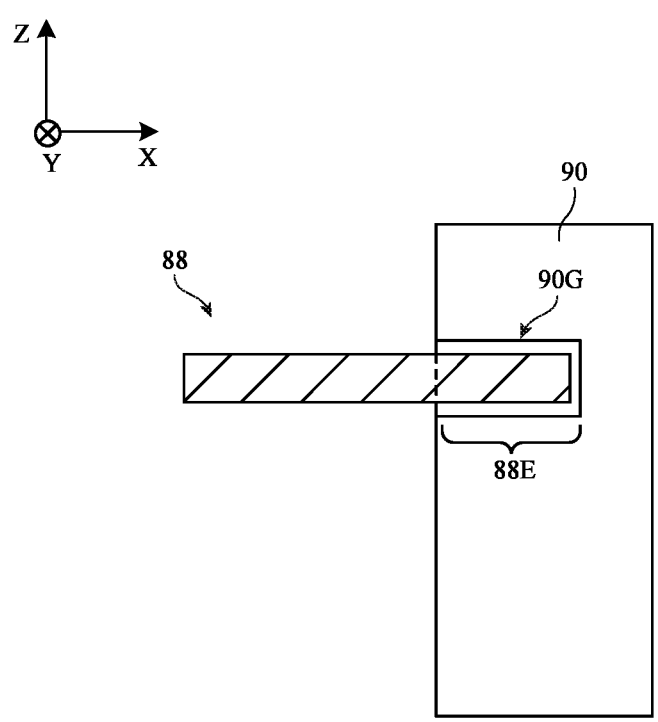
FIG. 6 is a cross-sectional side view of an illustrative lens shaping element coupled to an actuator in accordance with an embodiment.

Lens shaping element 88 has a plurality of tabs 88E that extend from the main portion of the lens shaping element. The tabs 88E (sometimes referred to as extensions 88E, actuator points 88E, etc.) may each be coupled to a respective actuator. As shown in FIG. 6, the tab 88E may protrude into a slot 90G (sometimes referred to as groove 90G, recess 90G, etc.) in actuator 90 (e.g., a tongue-and-groove arrangement). The slot 90G may selectively be moved up and down (e.g., in the Z-direction) to control the position of tab 88E in the Z-direction. In other words, actuator 90 is a linear actuator. A low stiffness elastomer may optionally be included in slot 90G to prevent significant backlash in embodiments where force is applied to tab 88E in multiple directions. The example of an actuator shown in FIG. 6 is merely illustrative. In general, any desired type of actuator may be used (e.g., an actuator with a hinge style paddle).

Returning to FIG. 5, it is shown how a plurality of tabs 88E (and corresponding actuators) may be distributed around the perimeter of lens shaping element 88. Tabs 88E may be distributed around lens shaping element 88 in a uniform manner (e.g., with equal spacing between each pair of adjacent tabs 88E) or in a non-uniform manner (e.g., with unequal spacing between at least two of the adjacent tabs 88E).

Between each pair of adjacent tabs 88E, there is a lens shaper segment 88S. In the example of FIG. 5, there are 8 tabs 88E around the perimeter of lens shaping element 88. This example is merely illustrative. In general, more tabs (and corresponding actuators) allows for greater control of the shape of the lens element (e.g., lens element 84) to which lens shaping element 88 is coupled. Any desired number of tabs and actuators (e.g., one, two, three, four, more than four, more than six, more than eight, more than ten, more than twelve, more than twenty, less than twenty, less than ten, between four and twelve, etc.) may be used depending upon the specific target shapes for the lens element, the target cost/complexity of the lens module, etc.

In general, each actuator may act as a point force that applies force only in one direction (e.g., parallel to the Z-axis). To prevent unintentionally applying torque or other force to the lens shaping element 88, slot 90G may be larger than extension 88E. This provides room for tab 88E to rotate within the slot (preventing torque from being applied to the lens shaper). Additionally, the extension 88E may slide in and out of the slot (e.g., parallel to the X-axis in FIG. 6) to prevent unintentionally stretching the lens shaping element.

Lens shaping element 88 may be elastomeric (e.g., a natural or synthetic polymer that has a low Young's modulus for high flexibility, as discussed above in greater detail) or semi-rigid (e.g., formed from a semi-rigid material that is stiff and solid, but not inflexible, as discussed above in greater detail). A semi-rigid lens shaping element may, for example, be formed from a thin layer of polymer, glass, metal, etc. Because lens shaping element 88 is formed in a ring around the lens module, lens shaping element 88 does not need to be transparent (and therefore may be formed from an opaque material such as metal).

Figure 7:
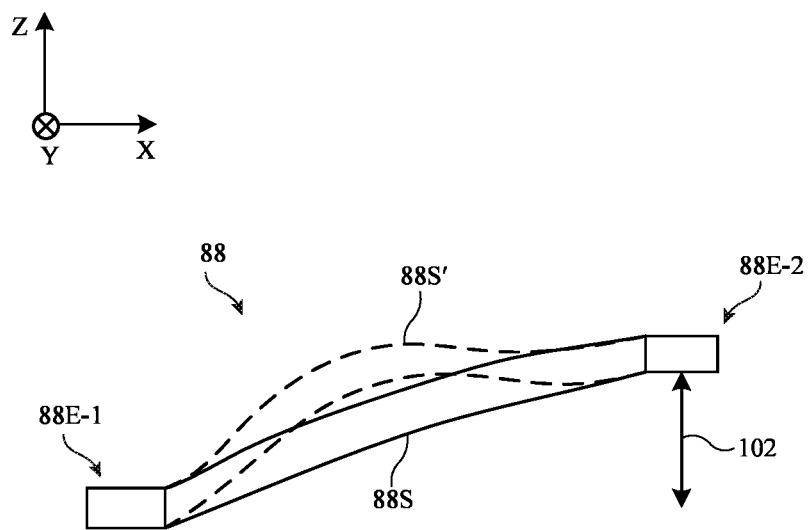
FIG. 7 is a cross-sectional side view of an illustrative lens shaping element showing how the profile of the lens shaping element may vary between actuator points in accordance with an embodiment.

The rigidity of lens shaping element 88 may be selected such that the lens shaping element assumes desired target shapes when manipulated by the actuators around its perimeter. However, depending upon the target shapes, specific materials used, and other design factors, the lens shaping element may sometimes have undesired bulges and deformities between actuators. FIG. 7 is a cross-sectional side view of an illustrative lens shaping element showing this phenomenon.

FIG. 7 shows an example where a first extension 88E-1 is positioned at a first location (e.g., by a corresponding first actuator). A second, adjacent extension 88E-2 is positioned at a second location (e.g., by a corresponding second actuator). Extension 88E-2 is positioned higher than extension 88E-1 (e.g., by distance 102). The positioning of extensions 88E-2 and 88E-1 (and the other extensions in the lens shaper) may be intended to impart a desired shape upon lens shaper segment 88S. The solid outline in FIG. 7 reflects the intended profile (e.g., curvature) for segment 88S. However, in practice the forces in the system may cause the segment to follow the dashed outline 88S'. In other words, the segment has an undesired bulge between extensions 88E-1 and 88E-2 and does not follow the target shape/curvature.

To ensure that lens shaping element 88 may be manipulated into desired target shapes, the segments between extensions 88S may be locally modified. For example, a property (e.g., the rigidity, shape, and/or thickness of the lens shaping element) may be selectively modified between tabs 88E relative to additional portions (e.g., unmodified portions) of the lens shaping element. The portion with the modified property may be referred to as a locally modified portion of the lens shaping element.

Figure 8:
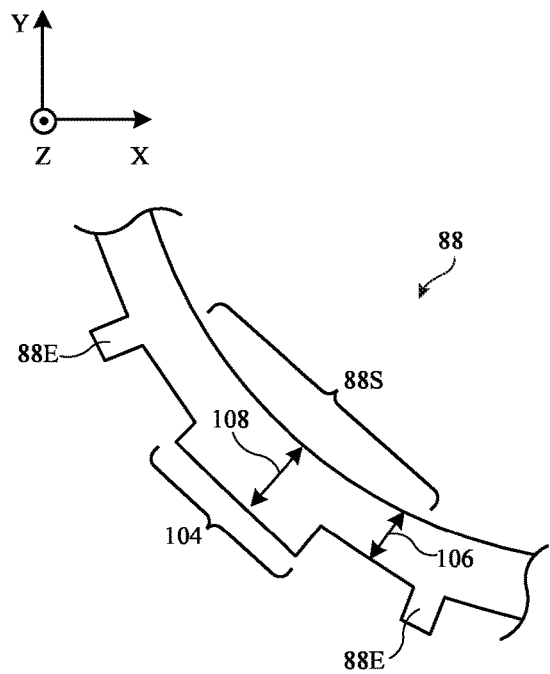
FIG. 8 is a top view of an illustrative lens shaping element with a locally modified portion having an increased width in accordance with an embodiment.

FIG. 8 is a top view of an illustrative lens shaping element 88 with a locally increased width. As shown, the lens shaping element 88 includes a segment 88S between adjacent extensions 88E (coupled to respective actuators). The segment 88S has a width 106. To locally modify the rigidity of the segment, segment 88S includes a locally modified portion 104 having a width 108 that is different than width 106.

In the example of FIG. 8, width 108 is greater than width 106, resulting in an increased rigidity in modified portion 104 relative to the other portions of segment 88S. This example is, however, merely illustrative. In another embodiment, width 108 may be less than width 106 to decrease rigidity in modified portion 104. Width 108 may be greater than width 106 by 1% or more, 5% or more, 10% or more, 20% or more, 40% or more, 50% or more, 75% or more, 100% or more, etc. Alternatively, width 106 may be greater than width 108 by 1% or more, 5% or more, 10% or more, 20% or more, 40% or more, 50% or more, 75% or more, 100% or more, etc. Each one of width 106 and 108 may be less than 20 millimeters, less than 15 millimeters, less than 10 millimeters, less than 5 millimeters, between 1 and 20 millimeters, etc.

Figure 9:
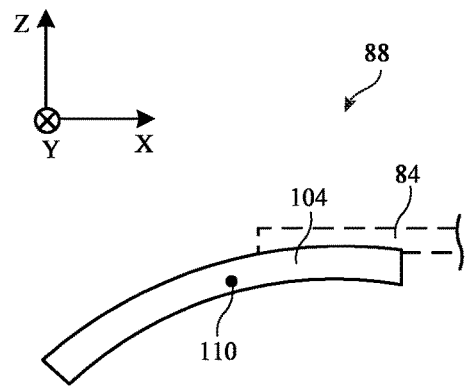
FIG. 9 is a cross-sectional side view of an illustrative lens shaping element with a locally modified portion having a bend in accordance with an embodiment.

In addition to the increased width of FIG. 8, the locally modified portion of segment 88S may have a bend. As shown in FIG. 9, modified portion 104 may be bent around a bend axis 110. The modified portion may be bent away from the side of the lens shaping element that is coupled to lens element 84 (as depicted in the example of FIG. 9). Including a bend in modified portion 104 between actuation points may increase the rigidity of the lens shaping element 88 in this region.

Figure 10:
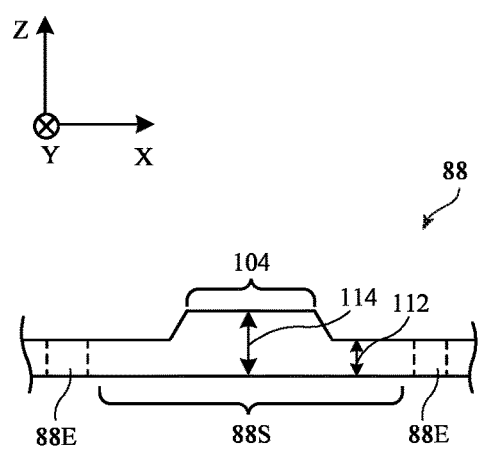
FIG. 10 is a cross-sectional side view of an illustrative lens shaping element with a locally modified portion having an increased thickness in accordance with an embodiment.

FIG. 10 is a top view of an illustrative lens shaping element 88 with a locally increased thickness. As shown, the lens shaping element 88 includes a segment 88S between adjacent extensions 88E (coupled to respective actuators). The segment 88S has a thickness 112. To locally modify the rigidity of the segment, segment 88S includes a locally modified portion 104 having a thickness 114 that is different than thickness 112.

In the example of FIG. 10, thickness 114 is greater than thickness 112, resulting in an increased rigidity in modified portion 104 relative to the other portions of segment 88S. This example is, however, merely illustrative. In another embodiment, thickness 114 may be less than thickness 112 to decrease rigidity in modified portion 104. Thickness 114 may be greater than thickness 112 by 1% or more, 5% or more, 10% or more, 20% or more, 40% or more, 50% or more, 75% or more, 100% or more, etc. Alternatively, thickness 112 may be greater than thickness 114 by 1% or more, 5% or more, 10% or more, 20% or more, 40% or more, 50% or more, 75% or more, 100% or more, etc. Each one of thicknesses 112 and 114 may be less than 10 millimeters, less than 5 millimeters, less than 1 millimeter, less than 0.5 millimeters, less than 0.1 millimeters, etc.

The change in the lens shaping element between the locally modified portion 104 and the remaining portion(s) of the segment 88S may be according to a step function or may be gradual. FIG. 8 shows an example where the width follows a step function (e.g., the width switches directly from a first width 106 to a second width 108 without any intervening widths). FIG. 10 shows an example where the thickness changes gradually (e.g., the thickness switches gradually from a first thickness 112 to a second thickness 114 with one or more intervening thicknesses). In general, any of the locally modified regions herein may have a property that changes according to a step function or that changes gradually.

Figure 11:
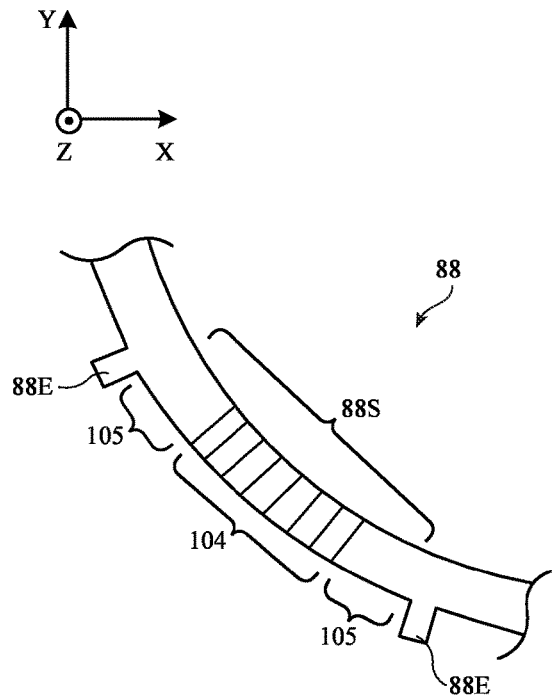
FIG. 11 is a top view of an illustrative lens shaping element with a locally modified portion having a varied elasticity in accordance with an embodiment.

FIG. 11 is a top view of an illustrative lens shaping element 88 with a locally modified elastic modulus. As shown, the lens shaping element 88 includes a segment 88S between adjacent extensions 88E (coupled to respective actuators). To locally modify the rigidity of the segment, segment 88S includes a locally modified portion 104 having an elasticity (e.g., Young's modulus) that is different than the remaining portions of the segment (sometimes referred to as unmodified portions 105 of segment 88S).

Locally modified portion 104 may have a greater elasticity (e.g., a smaller Young's modulus) than unmodified portions 105. Alternatively, locally modified portion 104 may have a greater rigidity (e.g., a greater Young's modulus) than unmodified portions 105. The maximum Young's modulus and minimum Young's modulus of the segment may differ by a factor of more than 1.01, more than 1.05, more than 1.1, more than 1.2, more than 1.5, more than 2, more than 3, more than 5, more than 10, less than 10, between 1 and 10, etc. As previously mentioned, the elasticity may change between the locally modified portion 104 and the unmodified portions 105 according to a step function or gradually. To achieve a gradual change in elasticity between unmodified portions 105 and modified portion 104, the lens shaping element may be formed using a heating and tempering process to selectively adjust the material in desired locations. In another possible example, a different material may be used in modified portion 104 than in unmodified portions 105. A shape memory alloy may optionally be used to form a portion of the lens shaping element 88.

The example of FIGS. 8-11 of having a modified portion interposed between first and second unmodified portions are merely illustrative. In general, the locally modified portion of the lens shaping element may be positioned at any desired location within the lens shaping element.

Figure 12A:
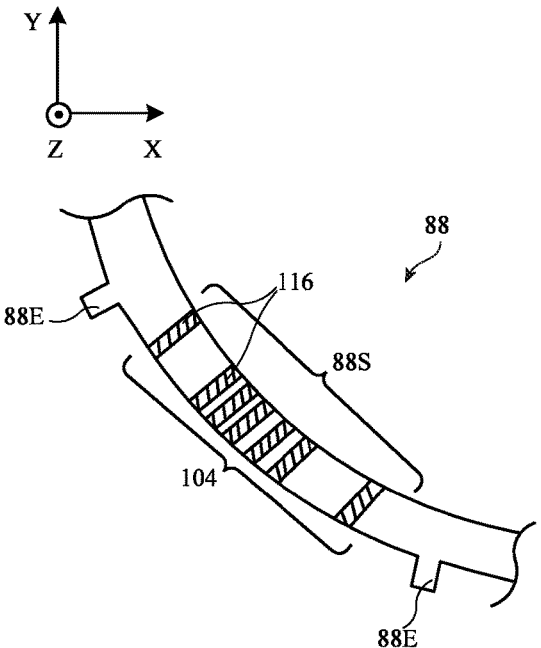
FIGS. 12A and 12B are cross-sectional side and top views of an illustrative lens shaping element having a locally modified portion with protrusions in accordance with an embodiment.
Figure 12B:
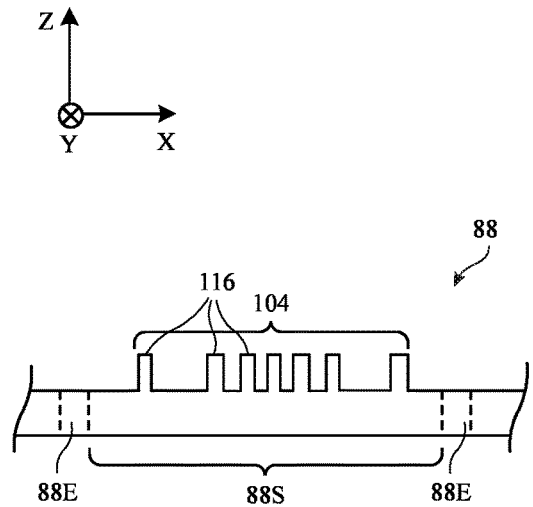

FIGS. 12A and 12B show yet another example of modifying the lens shaping element between actuator points. As shown in the top view of FIG. 12A, the lens shaping element 88 includes a segment 88S between adjacent extensions 88E (coupled to respective actuators). To locally modify the rigidity of the segment, segment 88S includes a locally modified portion 104 having protrusions 116. As shown in the cross-sectional side view of FIG. 12B, the protrusions extend from a surface of the lens shaping element 88. The density of the protrusions may vary (e.g., a gradual change in density as in FIG. 12B) or may be constant (e.g., a step-function between no protrusions and protrusions being present).

Figure 13A:
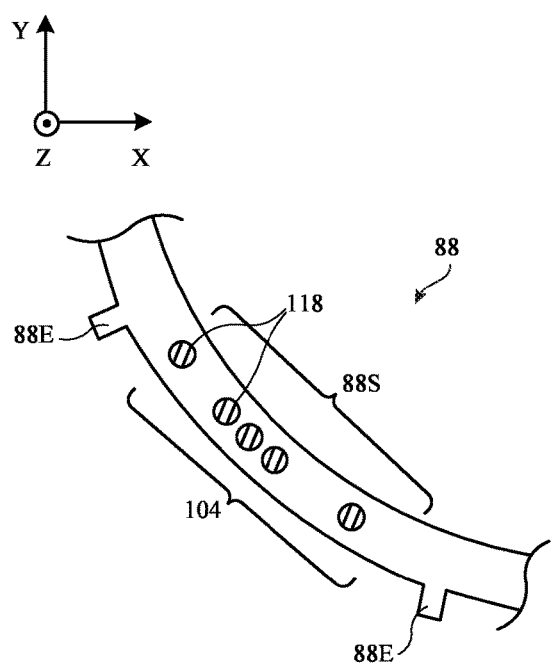
FIGS. 13A and 13B are cross-sectional side and top views of an illustrative lens shaping element having a locally modified portion with recesses in accordance with an embodiment.
Figure 13B:
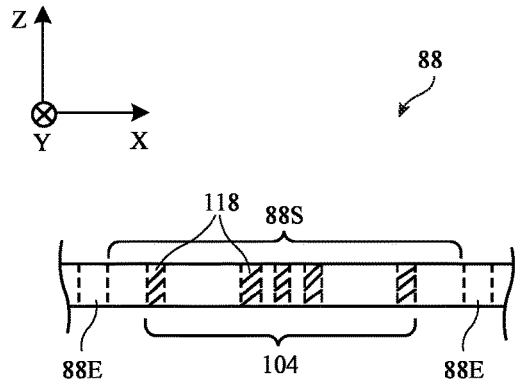

FIGS. 13A and 13B show yet another example of modifying the lens shaping element between actuator points. As shown in the top view of FIG. 13A, the lens shaping element 88 includes a segment 88S between adjacent extensions 88E (coupled to respective actuators). To locally modify the rigidity of the segment, segment 88S includes a locally modified portion 104 having recesses. As shown in the cross-sectional side view of FIG. 13B, the recesses may extend entirely from one surface of the lens shaping element to a second, opposing surface of the lens shaping element. The density of the recesses may vary (e.g., a gradual change in density as in FIG. 13B) or may be constant (e.g., a step-function between no recesses and recesses being present).

It should be noted that the above-referenced strategies for selectively adjusting the lens shaping element between actuators may be used in any combination. In other words, any subset of the concepts depicted in FIGS. 8-13 may be used together for a single segment 88S of the lens shaping element 88. The lens shaping element 88 may be used to adjust a corresponding lens element (e.g., lens element 84) between different shapes (e.g., spherical concave shapes, spherical convex shapes, cylindrical concave shapes, cylindrical convex shapes, irregular convex shapes, irregular concave shapes, etc.) having different degrees of curvature. The lens module may optionally include first and second lens shaping elements coupled to respective actuators on either side of the fluid-filled chamber if desired.

Additionally, it should be noted that different segments of the same lens shaping member 88 may have different arrangements. For example, a first segment of lens shaping member may have no locally modified portion. A second segment of the lens shaping member may have a locally modified portion with an increased rigidity relative to the unmodified portions of the segment. A third segment of the lens shaping member may have a locally modified portion with a decreased rigidity relative to the unmodified portions of the segment. In general, each segment of the lens shaping member may be optimized to provide the desired lens shapes during operation of the lens module.

Figure 14A:
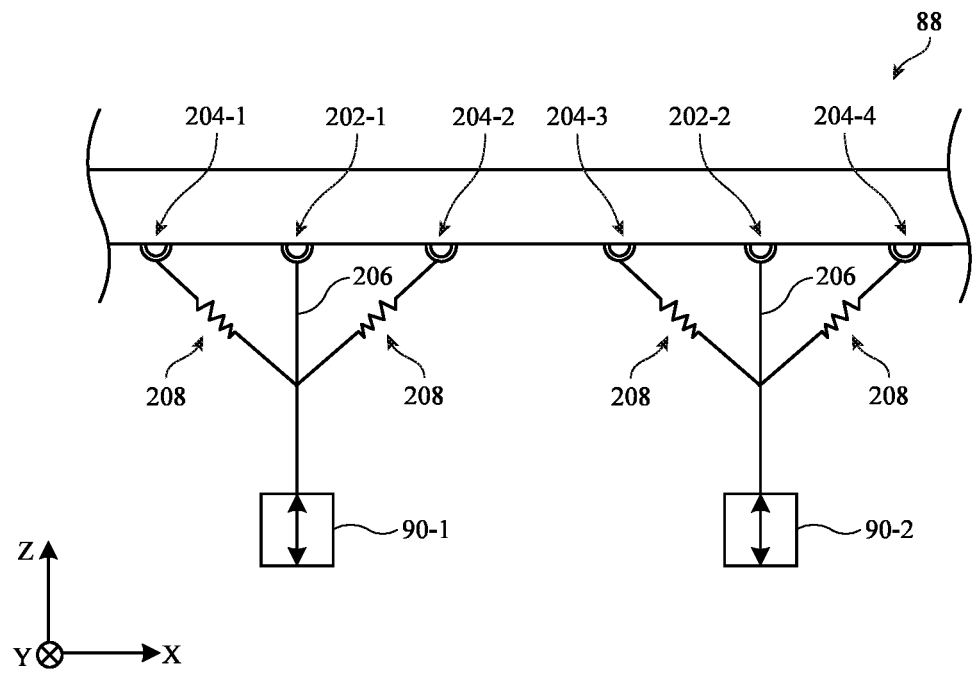
FIGS. 14A and 14B are cross-sectional side views of an illustrative lens shaping element that has multiple actuation points for each actuator to distribute force more evenly around the circumference of the lens shaping element in accordance with an embodiment.
Figure 14B:
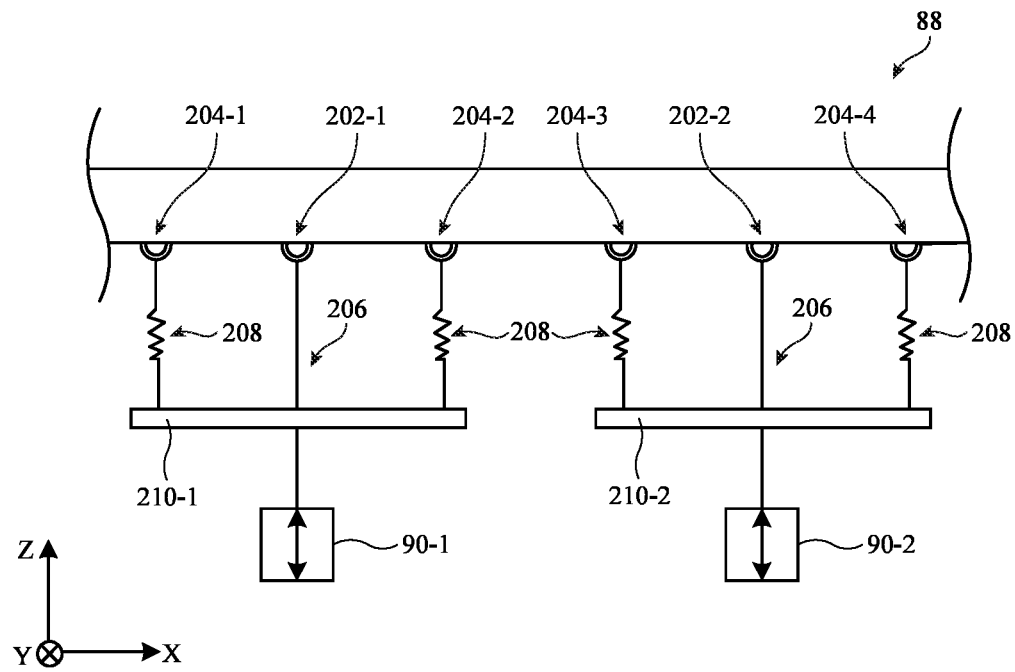

In the aforementioned examples, each actuator is described as being coupled to a single point on lens shaping element 88. For example, in FIG. 5, each tab 88E is coupled to a respective actuator and each actuator is coupled to only one respective tab. However, this example is merely illustrative. To distribute the force more evenly around the circumference of the lens shaping element, an actuator may have secondary actuation points in addition to a primary actuation point. FIGS. 14A and 14B show arrangements of this type.

FIG. 14A is a cross-sectional side view of an illustrative lens shaping element 88 with both primary actuation points (sometimes referred to as primary attachment points) and secondary actuation points (sometimes referred to as secondary attachment points). In FIG. 14A, actuators 90-1 and 90-2 are shown. Instead of each actuator being coupled to the lens shaping element at only one point (as in FIG. 5, for example), each actuator is coupled to lens shaping element 88 at multiple points. Actuator 90-1 is coupled to a primary actuation point 202-1 and first and second secondary actuation points 204-1 and 204-2. Similarly, actuator 90-2 is coupled to a primary actuation point 202-2 and first and second secondary actuation points 204-3 and 204-4.

Each primary actuation point 202-1 may be rigidly attached to its respective actuator. In other words, there is a rigid connection element 206 (sometimes referred to as rigid connector 206, rigid coupling component 206, rigid coupler 206, etc.) between primary actuation point 202-1 and actuator 90-1 that does not stretch under the load applied by the actuator (and instead pushes/pulls the primary actuation point). The rigid connector 206 may be a wire or other desired component. Accordingly, movement of the actuator directly correlates to movement of the lens shaping element at primary actuation point 202-1. This relationship holds for primary actuation point 202-2 as well, with a rigid connection element 206 that does not stretch under the load applied by actuator 90-2. Accordingly, movement of the actuator 90-2 directly correlates to movement of the lens shaping element at primary actuation point 202-2.

In addition to the primary actuation points, each actuator is coupled to one or more secondary actuation points. Actuator 90-1 is coupled to secondary actuation points 204-1 and 204-2 with respective compliant connection elements 208 (sometimes referred to as compliant connector 208, compliant coupling component 208, compliant coupler 208, etc.). The compliant connection elements 208 may include springs, foam, and/or other compliant materials that allow actuator 90-1 to apply force to secondary actuation points 204-1 and 204-2 while remaining flexible in their positions to distribute the actuation force more evenly along the deformable lens shaping element 88. A similar arrangement is used for actuator 90-2, with compliant connection elements 208 between actuator 90-2 and secondary actuation points 204-3 and 204-4.

These types of secondary actuation points may be used instead of or in addition to any of the previous methods for selectively adjusting the lens shaping element between actuators. As one example, actuators with secondary actuation points may be used with a lens shaping element 88 that has a uniform cross-sectional along its entire circumference (e.g., without any shape changes or increased/decreased rigidity regions).

The rigid connection elements 206 and the compliant connection elements 208 may be attached to the lens shaping element 88 (e.g., at the actuation points) in any desired manner. The connection elements may be attached to the lens shaping element using adhesive, using an interlocking attachment (e.g., through a recess in the lens shaping element), etc.

Any desired type of actuator may be used to apply force to both the primary actuation point and secondary actuation points (e.g., an actuator with a tongue-and-groove arrangement, an actuator with a hinge style paddle, an actuator with a cable/pulley arrangement, etc.). In general, any actuator may be used that ultimately selectively applies a force along the Z-axis as shown in FIG. 14A.

FIG. 14B is a cross-sectional side view of a lens shaping element 88 showing yet another arrangement for selectively applying force to the lens shaping element. In this arrangement, an intervening bar is included between the actuator and the lens shaping element 88. A first bar 210-1 is attached between actuator 90-1 and actuation points 202-1, 204-1, and 204-2. A second bar 210-2 is attached between actuator 90-2 and actuation points 202-2, 204-3, and 204-4. Each bar may be moved in the vertical direction by a point force applied by its respective actuator. Bar 210-1 is connected to primary actuation point 202-1 by a rigid connection element 206, is connected to secondary actuation point 204-1 by a compliant connection element 208, and is connected to secondary actuation point 204-2 by a compliant connection element 208. Bar 210-2 is connected to primary actuation point 202-2 by a rigid connection element 206, is connected to secondary actuation point 204-3 by a compliant connection element 208, and is connected to secondary actuation point 204-4 by a compliant connection element 208.

Bars 210-1 and 210-2 may be formed from a rigid or flexible material. The bars may be able to rotate, thus allowing the lens shaping element 88 to adopt positions (near a given actuator) that are sympathetic to neighboring actuator positions. Using bars 210-1 and 210-2 as well as the secondary actuation points allows for more symmetric loading with the actuation points and distributes the force from the actuators more evenly over the lens shaping element.

If desired, flexible lens element 84 may be extended outside the radius of lens shaping element 88 and be attached to one of the bars 210. The flexible lens element may be attached to a bar in strips (where the width of each strip determines the stiffness).

It should be noted that the order and number of actuation points in FIGS. 14A and 14B are merely illustrative. In general, each actuator may be coupled to any desired number of actuation points. Each actuation point may be coupled to the actuator with a rigid or compliant coupler.

In accordance with an embodiment, a system is provided that includes a head-mounted support structure, a display that emits light and a lens module supported by the head-mounted support structure that receives the light from the display, the lens module includes a transparent lens element, a lens shaping structure that is coupled to the transparent lens element, and a plurality of actuators that are configured to adjust a position of the lens shaping structure to adjust the transparent lens element, the lens shaping structure has at least first and second portions, the first portion is interposed between first and second actuators of the plurality of actuators, and the first portion has a property with a different magnitude than the second portion.

In accordance with another embodiment, the lens shaping structure has a plurality of extensions and each extension of the plurality of extensions is coupled to a respective actuator of the plurality of actuators.

In accordance with another embodiment, the lens shaping structure includes a respective segment between each adjacent pair of extensions, the locally modified portion is formed in a first segment between first and second adjacent extensions, and the first and second extensions are coupled to the first and second actuators, respectively.

In accordance with another embodiment, the lens shaping structure extends in a ring around a central opening and the transparent lens element overlaps the central opening.

In accordance with another embodiment, the property is width, the first portion has a first width, the second portion has a second width, and the first and second widths are different.

In accordance with another embodiment, the locally modified portion includes a bend.

In accordance with another embodiment, the property is thickness, the first portion has a first thickness, the second portion has a second thickness, and the first and second thicknesses are different.

In accordance with another embodiment, the property is Young's modulus, the first portion has a first Young's modulus, the second portion of the lens shaping structure has a second Young's modulus, and the first and second Young's moduli are different.

In accordance with another embodiment, the first portion includes a plurality of protrusions.

In accordance with another embodiment, the first portion includes a plurality of recesses.

In accordance with another embodiment, the property is rigidity and the first portion has a higher rigidity than the second portion.

In accordance with another embodiment, the property is rigidity and the first portion has a lower rigidity than the second portion.

In accordance with another embodiment, the first actuator is coupled to a primary actuation point on the lens shaping structure and a secondary actuation point on the lens shaping structure.

In accordance with an embodiment, a lens module is provided that includes a transparent lens element, a ring-shaped structure that is coupled to the transparent lens element, and a plurality of actuators that are configured to adjust the ring-shaped structure to adjust curvature of the transparent lens element, the ring-shaped structure has first and second actuation points that are coupled to respective first and second actuators of the plurality of actuators, the ring-shaped structure has a segment between the first and second actuation points, a first portion of the segment has a first rigidity, and a second portion of the segment has a second rigidity that is different than the first rigidity.

In accordance with another embodiment, the first portion of the segment has a first width, the second portion of the segment has a second width, and the first and second widths are different.

In accordance with another embodiment, the first portion of the segment has a first thickness, the second portion of the segment has a second thickness, and the first and second thicknesses are different.

In accordance with another embodiment, the first portion of the segment has a first Young's modulus, the second portion of the segment has a second Young's modulus, and the first and second Young's moduli are different.

In accordance with another embodiment, the first portion of the segment is interposed between the second portion of the segment and a third portion of the segment and the third portion of the segment has the second rigidity.

In accordance with another embodiment, the first rigidity is greater than the second rigidity.

In accordance with another embodiment, the first rigidity is less than the second rigidity.

In accordance with an embodiment, a system is provided that includes a head-mounted support structure, a display that emits light, and a lens module supported by the head-mounted support structure that receives the light from the display, the lens module includes a first transparent lens element, a second transparent lens element, a fluid-filled chamber between the first and second transparent lens elements, an annular member that is coupled to the first transparent lens element, and a plurality of actuators that are configured to selectively apply force to the annular member to adjust the first transparent lens element, the annular member has a portion between adjacent actuators with a higher rigidity than an additional portion of the annular member.

In accordance with an embodiment, a lens module is provided that includes a transparent lens element, a ring-shaped structure that is coupled to the transparent lens element, and a plurality of actuators that are configured to adjust the ring-shaped structure to adjust curvature of the transparent lens element, a first actuator of the plurality of actuators is coupled to both a primary actuation point on the ring-shaped structure and a secondary actuation point on the ring-shaped structure.

In accordance with another embodiment, the lens module includes a rigid coupler between the actuator and the primary actuation point, and a compliant coupler between the actuator and the secondary actuation point.

In accordance with another embodiment, the lens module includes a bar that is coupled to the rigid coupler and the compliant coupler, the actuator is coupled to the bar.

The foregoing is merely illustrative and various modifications can be made to the described embodiments. The foregoing embodiments may be implemented individually or in any combination.

What is claimed is:

1. A system, comprising:
   a head-mounted support structure;
   a display that emits light; and
   a lens module supported by the head-mounted support structure, wherein the lens module receives the light from the display and wherein the lens module comprises:
   a transparent lens element;
   a lens shaping structure that is coupled to the transparent lens element; and
   a plurality of actuators that are configured to adjust a position of the lens shaping structure to adjust the transparent lens element, wherein the lens shaping structure has at least first and second portions, wherein the first portion is interposed between first and second actuators of the plurality of actuators, and wherein the first portion has a property with a different magnitude than the second portion.

2. The system defined in claim 1, wherein the lens shaping structure has a plurality of extensions and wherein each extension of the plurality of extensions is coupled to a respective actuator of the plurality of actuators.

3. The system defined in claim 2, wherein the lens shaping structure includes a respective segment between each adjacent pair of extensions, wherein the first portion is formed in a first segment between first and second adjacent extensions, and wherein the first and second extensions are coupled to the first and second actuators, respectively.

4. The system defined in claim 1, wherein the lens shaping structure extends in a ring around a central opening and wherein the transparent lens element overlaps the central opening.

5. The system defined in claim 1, wherein the property is width, wherein the first portion has a first width, wherein the second portion has a second width, and wherein the first and second widths are different.

6. The system defined in claim 5, wherein the first portion includes a bend.

7. The system defined in claim 1, wherein the property is thickness, wherein the first portion has a first thickness, wherein the second portion has a second thickness, and wherein the first and second thicknesses are different.

8. The system defined in claim 1, wherein the property is Young's modulus, wherein the first portion has a first Young's modulus, wherein the second portion has a second Young's modulus, and wherein the first and second Young's moduli are different.

9. The system defined in claim 1, wherein the first portion includes a plurality of protrusions.

10. The system defined in claim 1, wherein the first portion includes a plurality of recesses.

11. The system defined in claim 1, wherein the property is rigidity and wherein the first portion has a higher rigidity than the second portion.

12. The system defined in claim 1, wherein the property is rigidity and wherein the first portion has a lower rigidity than the second portion.

13. The system defined in claim 1, wherein the first actuator is coupled to a primary actuation point on the lens shaping structure and a secondary actuation point on the lens shaping structure.

14. A lens module comprising:
a transparent lens element;
a ring-shaped structure that is coupled to the transparent lens element; and
a plurality of actuators that are configured to adjust the ring-shaped structure to adjust curvature of the transparent lens element, wherein the ring-shaped structure has first and second actuation points that are coupled to respective first and second actuators of the plurality of actuators, wherein the ring-shaped structure has a segment between the first and second actuation points, wherein a first portion of the segment has a first rigidity, and wherein a second portion of the segment has a second rigidity that is different than the first rigidity.

15. The lens module defined in claim 14, wherein the first portion of the segment has a first width, wherein the second portion of the segment has a second width, and wherein the first and second widths are different.

16. The lens module defined in claim 14, wherein the first portion of the segment has a first thickness, wherein the second portion of the segment has a second thickness, and wherein the first and second thicknesses are different.

17. The lens module defined in claim 14, wherein the first portion of the segment has a first Young's modulus, wherein the second portion of the segment has a second Young's modulus, and wherein the first and second Young's moduli are different.

18. The lens module defined in claim 14, wherein the first portion of the segment is interposed between the second portion of the segment and a third portion of the segment and wherein the third portion of the segment has the second rigidity.

19. The lens module defined in claim 18, wherein the first rigidity is greater than the second rigidity.

20. The lens module defined in claim 18, wherein the first rigidity is less than the second rigidity.

21. A system, comprising:
a head-mounted support structure;
a display that emits light; and
a lens module supported by the head-mounted support structure, wherein the lens module receives the light from the display and wherein the lens module comprises:
a first transparent lens element;
a second transparent lens element;
a fluid-filled chamber between the first and second transparent lens elements;
an annular member that is coupled to the first transparent lens element; and
a plurality of actuators that are configured to selectively apply force to the annular member to adjust the first transparent lens element, wherein the annular member has a portion between adjacent actuators with a higher rigidity than an additional portion of the annular member.

22. A lens module comprising:
a transparent lens element;
a ring-shaped structure that is coupled to the transparent lens element; and
a plurality of actuators that are configured to adjust the ring-shaped structure to adjust curvature of the transparent lens element, wherein a first actuator of the plurality of actuators is coupled to both a primary actuation point on the ring-shaped structure and a secondary actuation point on the ring-shaped structure.

23. The lens module defined in claim 22, further comprising:
a rigid coupler between the first actuator and the primary actuation point; and
a compliant coupler between the first actuator and the secondary actuation point.

24. The lens module defined in claim 23, further comprising:
a bar that is coupled to the rigid coupler and the compliant coupler, wherein the first actuator is coupled to the bar.

* * * * *